United States Patent [19]

Fernsler et al.

[11] Patent Number: 4,742,270
[45] Date of Patent: May 3, 1988

[54] DEGAUSSING CIRCUIT WITH RESIDUAL CURRENT CUTOFF

[75] Inventors: Ronald E. Fernsler, Indianapolis; George C. Waybright, Carmel, both of Ind.

[73] Assignee: RCA Corporation, Princeton, N.J.

[21] Appl. No.: 782,243

[22] Filed: Sep. 30, 1985

[51] Int. Cl.$^4$ .............................................. H01J 29/06
[52] U.S. Cl. .............................................. 315/8; 315/1
[58] Field of Search ........................................ 315/8, 1

[56] References Cited

U.S. PATENT DOCUMENTS

| | | | |
|---|---|---|---|
| 2,962,622 | 11/1960 | Popovich | 315/8 |
| 3,249,795 | 5/1966 | Dietch | 315/8 |
| 3,582,721 | 6/1971 | Van Hoorn | 315/8 |
| 3,733,524 | 5/1973 | Cooksey et al. | 317/157.5 |
| 4,295,078 | 10/1981 | Wilmarth | 315/8 |

FOREIGN PATENT DOCUMENTS 2034704 7/1970 Fed. Rep. of Germany .
1238771 7/1971 United Kingdom .
2150400 6/1985 United Kingdom .

*Primary Examiner*—Harold Dixon
*Attorney, Agent, or Firm*—Paul J. Rasmussen; Joseph J. Laks; Scott J. Stevens

[57] ABSTRACT

A degaussing circuit for a video display apparatus eliminates residual degaussing current flow during operation of the video display apparatus. A capacitor is connected between coil of the degaussing relay and the source of energizing voltage. Application of the energizing voltage to the relay coil energizes the relay and initiates degaussing of the cathode ray tube of the video display apparatus, and also causes the capacitor to begin charging. As the capacitor becomes charged, the degaussing relay becomes deenergized, thereby terminating degaussing current flow. The capacitor charging time constant is selected to allow sufficient time for degaussing to occur before deenergization of the degaussing relay.

4 Claims, 5 Drawing Sheets

DEGAUSSING CIRCUIT WITH RESIDUAL CURRENT CUTOFF

This invention relates to degaussing circuits for video display apparatus and, in particular, to degaussing circuits that terminate all residual degaussing current after a predetermined period of time.

Cathode ray tubes for color video display apparatus require periodic degaussing, or demagnetization, of the metal parts of the tube and surrounding circuitry in order to prevent degradation of tube color purity. This magnetization can occur due to the presence of the earth's magnetic field or to stray fields produced by motors or electrical equipment operating nearby. Since the orientation of the earth's magnetic field with respect to the tube changes each time the video display apparatus is moved, degaussing may be frequently required, particularly in the operation of computer monitors, which are often moved or rotated to accommodate different users.

A typical degaussing method includes the use of temperature dependent varistors that change in resistance value as they become heated by the flow of degaussing current derived from the 60 Hz AC line. This change in resistance value is utilized by appropriate circuitry to cause the degaussing current to decrease in a desired manner to effect demagnetization of the metallic parts of the tube. This arrangement is economical and provides effective degaussing; however, since the degaussing current does not decay to zero, some residual degaussing current may continue to flow such that this residual current results in some magnetization of the tube. Additionally, in order to provide repeated degaussing, the video display apparatus must be turned off for several minutes to allow the varistors to cool such that sufficient degaussing current flows when the set is reenergized. This is inconvenient when used in a computer monitor where the monitor may be moved during operation.

Another type of degaussing circuit, known as the resonant type, causes a capacitor to discharge through the degaussing coil. The resonant circuit determined by the capacitor and the coil generates a high frequency alternating current that decays as the capacitor charge is dissipated, thereby effecting degaussing of the tube. This arrangement is useful for computer monitors as repeated degaussing may be performed while the video display apparatus is in operation, but is more complex than the previously described AC line derived degaussing circuit. It may also be difficult to provide effective degaussing for large screen tube, e.g., 25 V, using resonant degaussing circuits because of the difficulty in generating sufficient degaussing current for a sufficient length of time. It would be desirable, therefore, to have a degaussing circuit with the economy and degaussing effectiveness of a PTC circuit and the frequency repeatability with no residual current available of the resonant degaussing circuit.

In accordance with the present invention, a degaussing circuit for a cathode ray tube of a video display apparatus comprises a circuit for providing an alternating current when the video display apparatus is energized. A degaussing coil is located adjacent to the tube and a switch responds to the presence of the alternating current to cause the current to flow in the degaussing coil. Circuitry responds to the flow of current to cause the current to decrease in the degaussing coil. A capacitor becomes charged and causes the switch to become nonconductive so that the current flow through the degaussing coil is terminated. Circuitry discharges the capacitor when the video display apparatus is deenergized.

In the accompanying drawing, FIG. 1 is a schematic and block diagram of a portion of a video display apparatus incorporating an aspect of the present invention;

Figure 1:
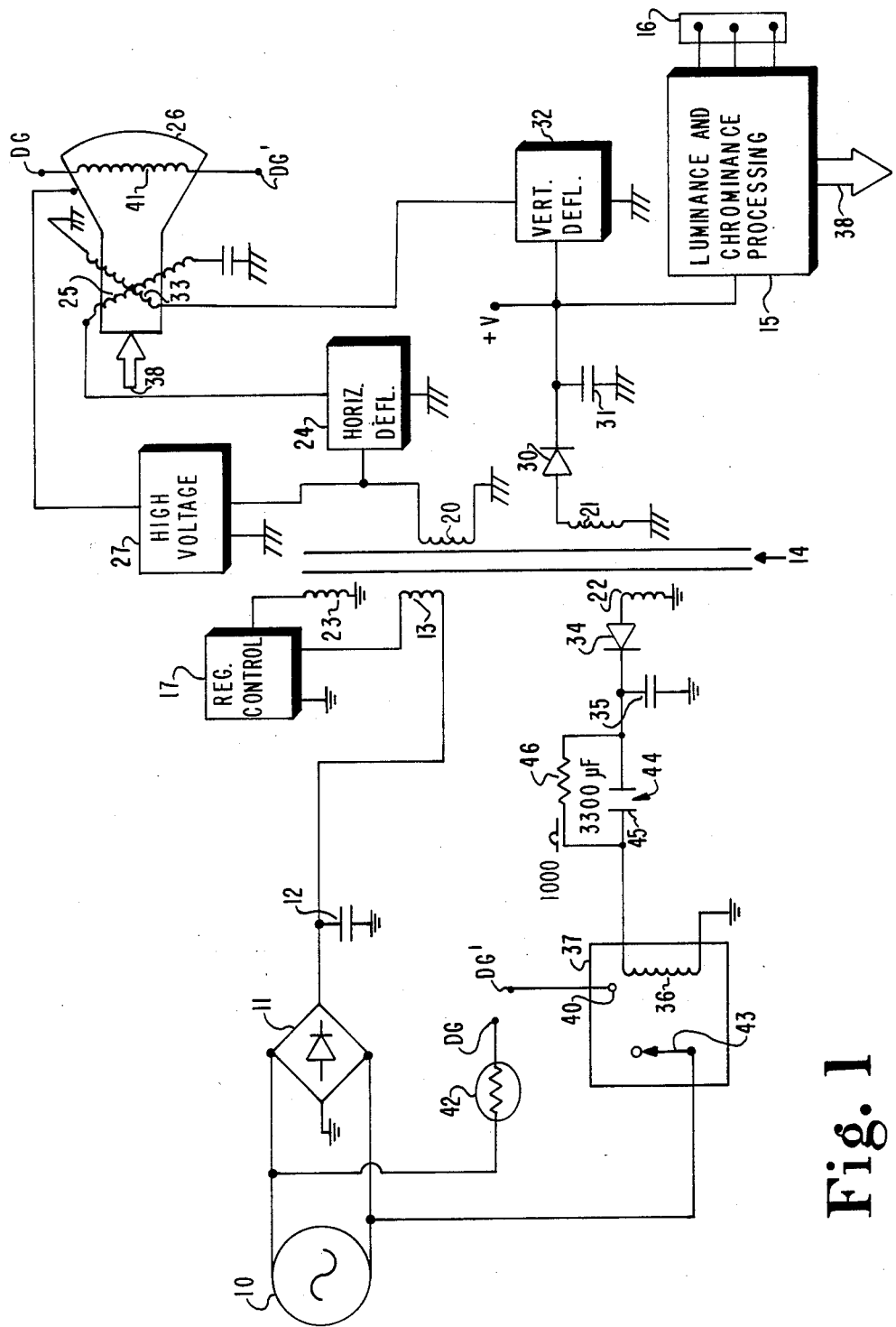

Referring to FIG. 1, there is shown a portion of a video display apparatus, which may illustratively be used as a computer monitor, in which a source of AC voltage 10 is coupled to a bridge rectifier 11 and a filter capacitor 12 to develop an unregulated DC voltage. The DC voltage is applied to one terminal of a primary winding 13 of a power transformer 14. Transformer 14 illustratively provides electrical isolation, i.e., current-limiting impedance, between the circuitry connected to the source of AC voltage 10 and circuitry connected to user accessible terminals, such as luminance and chrominance processing circuit 15, which is connected to red, green and blue video signal input terminal 16. The other terminal of primary winding 13 is connected to a regulator control circuit 17, which controls the current conduction through primary winding 13 in a manner to develop regulated voltages across the secondary windings 20, 21 and 22 of transformer 14. Winding 23 provides a feedback voltage to regulator control circuit 17.

The voltage developed across secondary winding 20 illustratively provides power for horizontal deflection circuitry 24 that in turn produces horizontal or line rate deflection current in deflection winding 25, located on the neck of a cathode ray tube 26. The voltage developed across winding 20 is also applied to high voltage generating circuitry 27, which may include a high voltage transformer, that rectifies and steps up the voltage to a level of the order of 30,000 volts to produce the high voltage or ultor potential for cathode ray tube 26.

Winding 21 develops a voltage that is rectified by diode 30 and filtered by capacitor 31 to provide a supply voltage +V that may illustratively be used to power luminance and chrominance processing circuitry 15 which in turn provides red, green and blue video drive signals to cathode ray tube 26 via conductors designated 38. The voltage +V is also applied to a vertical deflection circuit 32 which generates vertical or field rate deflection current in a deflection winding 33, also located on the neck of tube 26.

The voltage developed across secondary winding 22 is rectified and filtered by diode 34 and capacitor 35, respectively, to provide a voltage that is applied to the energizing coil 36 of a degaussing relay 37. The normally open contact 40 of relay 37 is coupled to degaussing coil 41, located in the vicinity of tube 26, via a terminal DG'. The other terminal of degaussing coil 41, designated DG, is coupled via a positive temperature coefficient (PTC) resistor 42 to the source of AC voltage 10. The actuator 43 of relay 37 is also connected to the source of AC voltage 10.

The voltage across winding 22 causes current to flow in coil 36 of relay 37 sufficient to cause actuator 43 to become electrically connected to normally open terminal 40. This causes the alternating degaussing current to flow from the AC voltage source 10 through degaussing coil 41 and PTC resistor 42. Current flow in PTC resistor 42 causes it to heat, increasing its resistance and thereby decreasing the degaussing current in the desired manner to effect demagnetization of the tube 26. Although PTC resistor 42 causes the current flow to decrease greatly in magnitude, a finite residual current will continue to flow.

Figure 2:
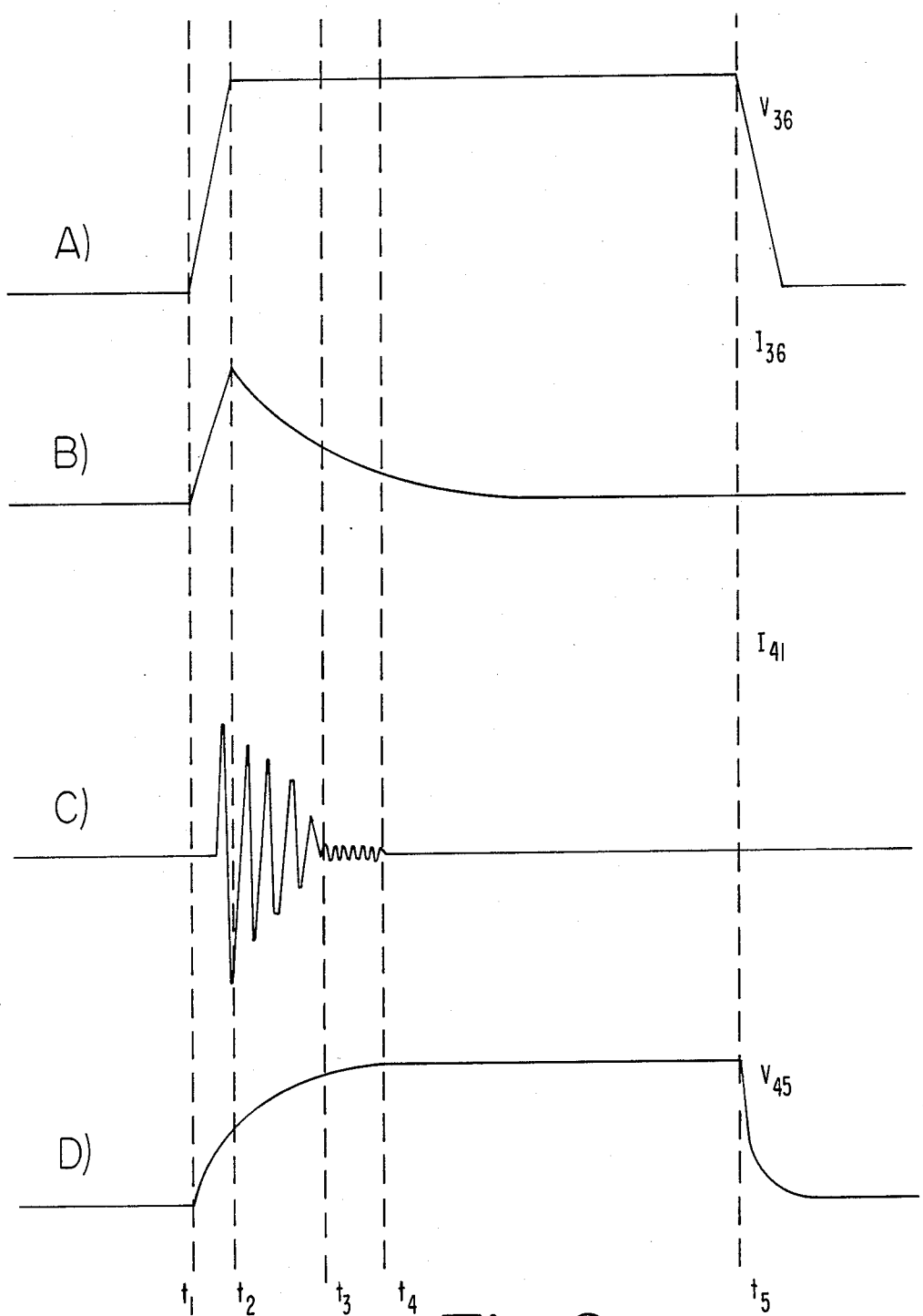
FIG. 2 illustrates waveforms useful in understanding the operation of the circuit shown in FIG. 1.

In accordance with an aspect of the present invention, the voltage developed across winding 22 is applied to relay coil 36 via a relay disconnect circuit 44 comprising the parallel combination of a capacitor 45 and a resistor 46. As the voltage is applied to relay coil 36 at a time $t_1$, as shown in FIG. 2A, the voltage increases to a maximum value at a time $t_2$. As the voltage increases, the current flow in coil 36 also increases, as can be seen in FIG. 2B, so that a magnetic field of sufficient intensity is generated to energize the relay and cause the relay actuator 43 to be brought into contact with relay terminal 40. This causes the alternating degaussing current, shown in FIG. 2C, to flow in degaussing coil 41. Heating of PTC resistor 42 causes the degaussing current to decrease until a time $t_3$, when only the residual current flow remains. The combination of the resistance of coil 36 and capacitor 45 forms an RC network having a time constant that allows capacitor 45 to charge as shown in FIG. 2D. As capacitor 45 charges, the current in relay coil 36 decreases until a time $t_4$, when the magnetic field generated by coil 36 current flow is insufficient to hold the relay actuator 43 in contact with terminal 40. The relay then "drops out" or becomes deenergized. The residual degaussing current through degaussing coil 41 is therefore desirably terminated. PTC resistor 42 will begin to cool so that repeated degaussing operations may be accomplished without the necessity of maintaining the video display apparatus in a deenergized or "off" state for the length of time necessary for the PTC resistor 42 to cool, as is common with typical degaussing circuits.

When the video display apparatus is deenergized, at a time $t_5$, capacitor 45 discharges quickly via resistor 46 to enable degaussing to again be performed. Resistor 46 also provides the advantageous feature that current flow through resistor 46 establishes a DC voltage bias level on relay coil 36. This has the effect of increasing the initial current flow in relay coil 36, so that actuator 43 is held in contact with terminal 40 for a longer duration or period of time than would occur if resistor 40 were absent. This insures that the duration of degaussing current flow is sufficient to provide effective degaussing of cathode ray tube 26; i.e., the duration of relay energization is greater than the necessary degaussing duration.

Figure 3:
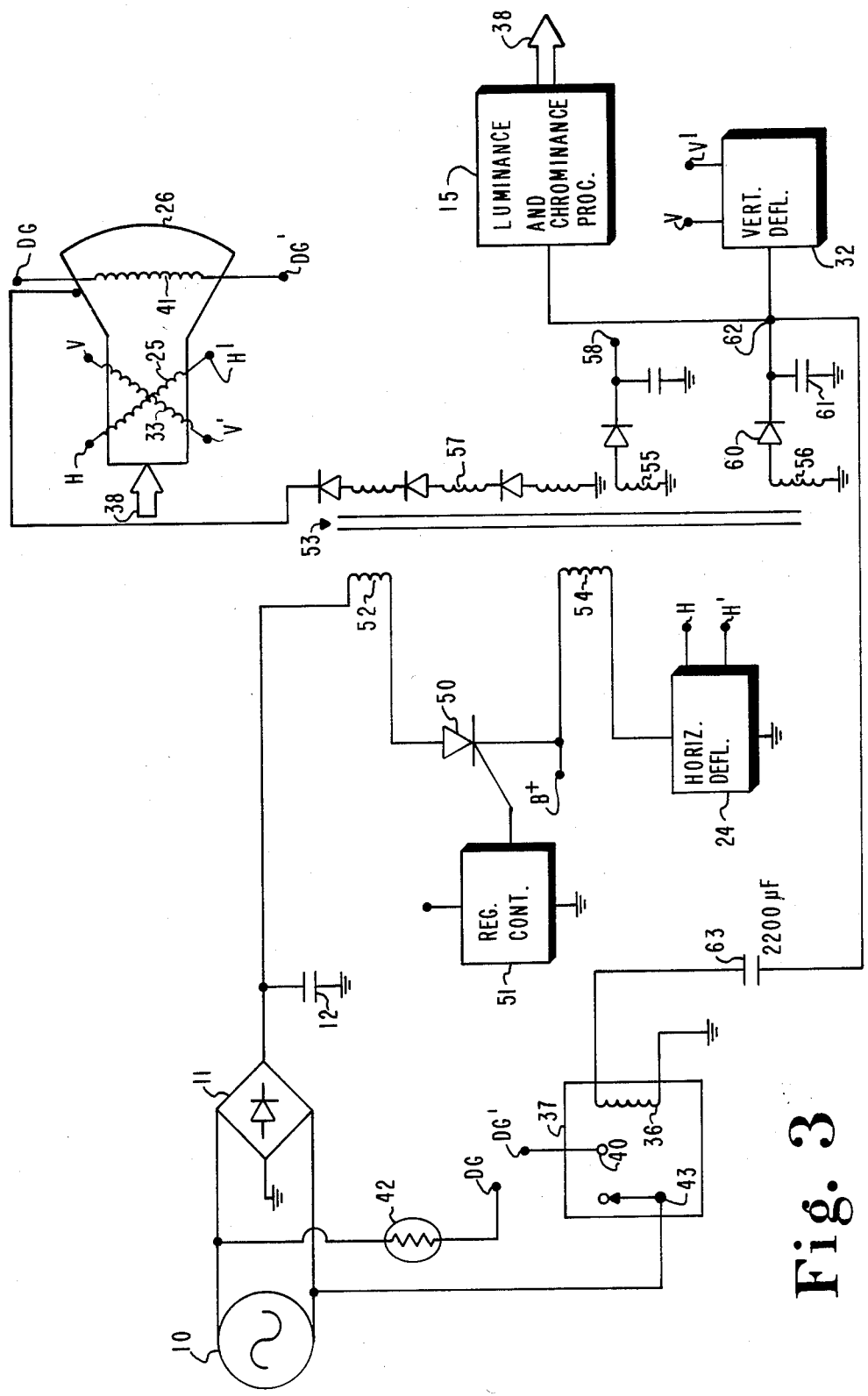
FIG. 3 is a schematic and block diagram of a video display apparatus incorporating another aspect of the present invention.

FIG. 3 illustrates an embodiment of a video display apparatus having a switched mode regulator incorporating an SCR 50. Elements in FIG. 3 corresponding to those in FIG. 1 are designated with the same reference numerals.

Conduction of SCR 50, which is controlled by regulator control circuit 51, causes current to flow via primary winding 52 of transformer 53 from the source of unregulated DC voltage developed across capacitor 12 to develop a regulated voltage, designated B+, at the cathode of SCR 50. This regulated B+ voltage is applied to a primary winding 54 of transformer 53 which, by transformer action, develops voltages across secondary windings 55 and 56, and high voltage winding 57. The B+ voltage is also used to power the horizontal deflection circuit 24. The voltage across winding 55 is rectified and filtered to produce a DC voltage at a terminal 58 that provides a feedback voltage to regulator control circuit 51.

The voltage across secondary winding 56 is rectified by diode 60 and filtered by capacitor 61 to provide a regulated DC voltage at a terminal 62 that is illustratively used to power vertical deflection circuit 32 and chrominance and luminance processing circuit 15. This voltage is also used to energize relay coil 36 of degaussing relay 37 to effect degaussing of cathode ray tube 26 in a manner previously described.

Figure 4:
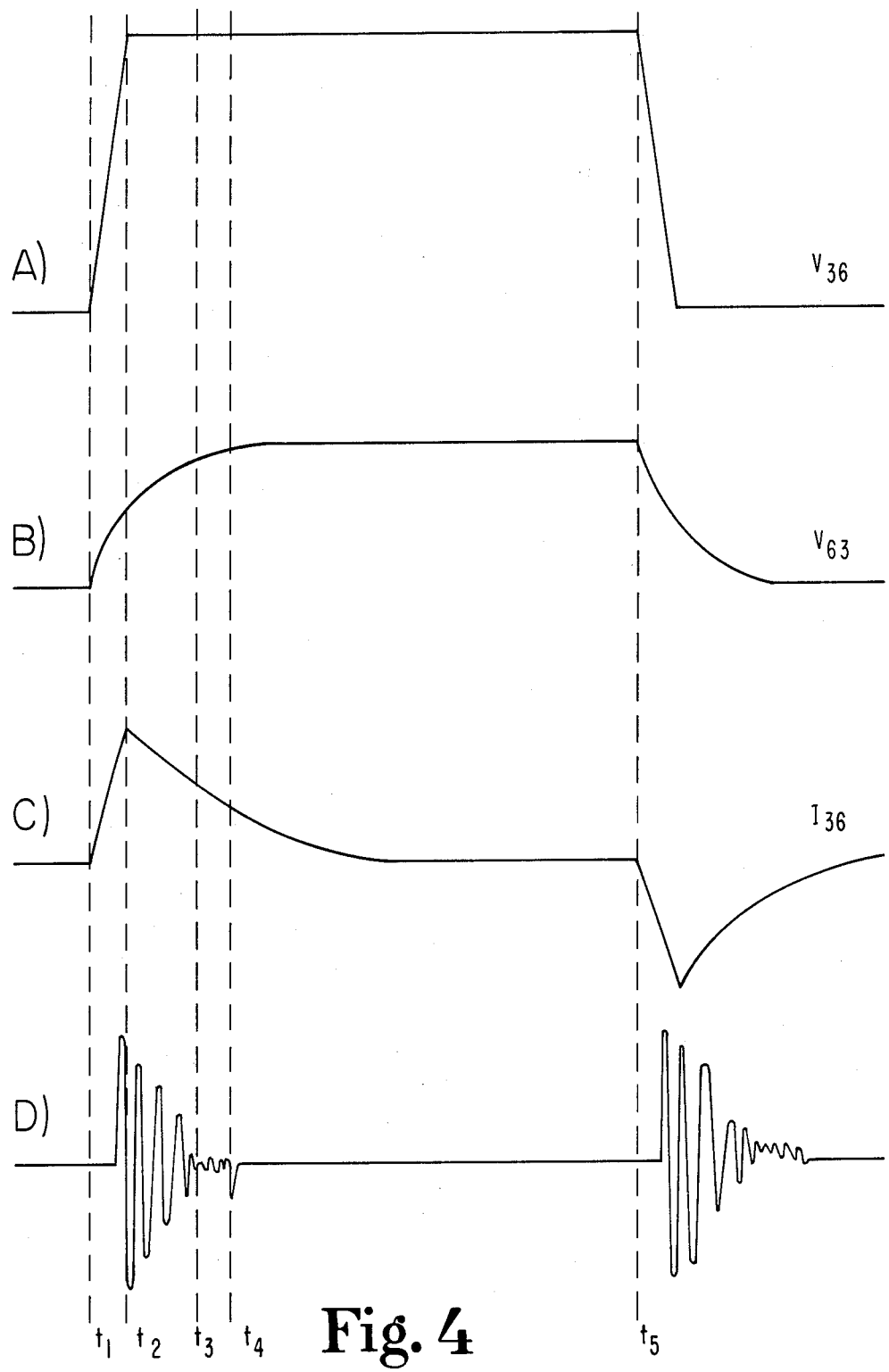
FIG. 4 illustrates waveforms associated with the circuit of FIG. 3.

In accordance with an aspect of the present invention, a capacitor 63 is coupled between relay coil 36 and terminal 62. As the voltage across relay coil 36 increases, from a time $t_1$ to a time $t_2$ as shown in FIG. 4A, capacitor 63 begins to charge, as shown in FIG. 4B, at a rate determined by the RC time constant of coil 36 and capacitor 63 so that as capacitor 63 becomes charged the current through coil 36 decreases as shown in FIG. 4C. The value of capacitor 63 is selected so that the relay 37 remains energized until a time $t_3$ when effective degaussing has occurred. At time $t_4$, the magnetic field produced by coil 36 is weakened due to reduced current flow and relay 37 becomes deenergized, thereby terminating the residual degaussing current in degaussing coil 41, as shown in FIG. 4D. For example, for a degaussing relay having a coil resistance of 820 ohms, a capacitor having a value of 2200 μF will provide a time constant that provides a relay energization duration greater than the desired degaussing duration.

When the video display apparatus is turned off, at time $t_5$, the load presented by vertical deflection circuit 32 will cause capacitor 63 to rapidly discharge from ground through relay coil 36. The discharge current of capacitor 63 is sufficient to energize relay 37 so that degaussing again takes place, as shown in FIG. 4D. The degaussing circuit of FIG. 3 will therefore perform a degaussing function upon both the turn-on and turn-off of the video display apparatus.

Figure 5:
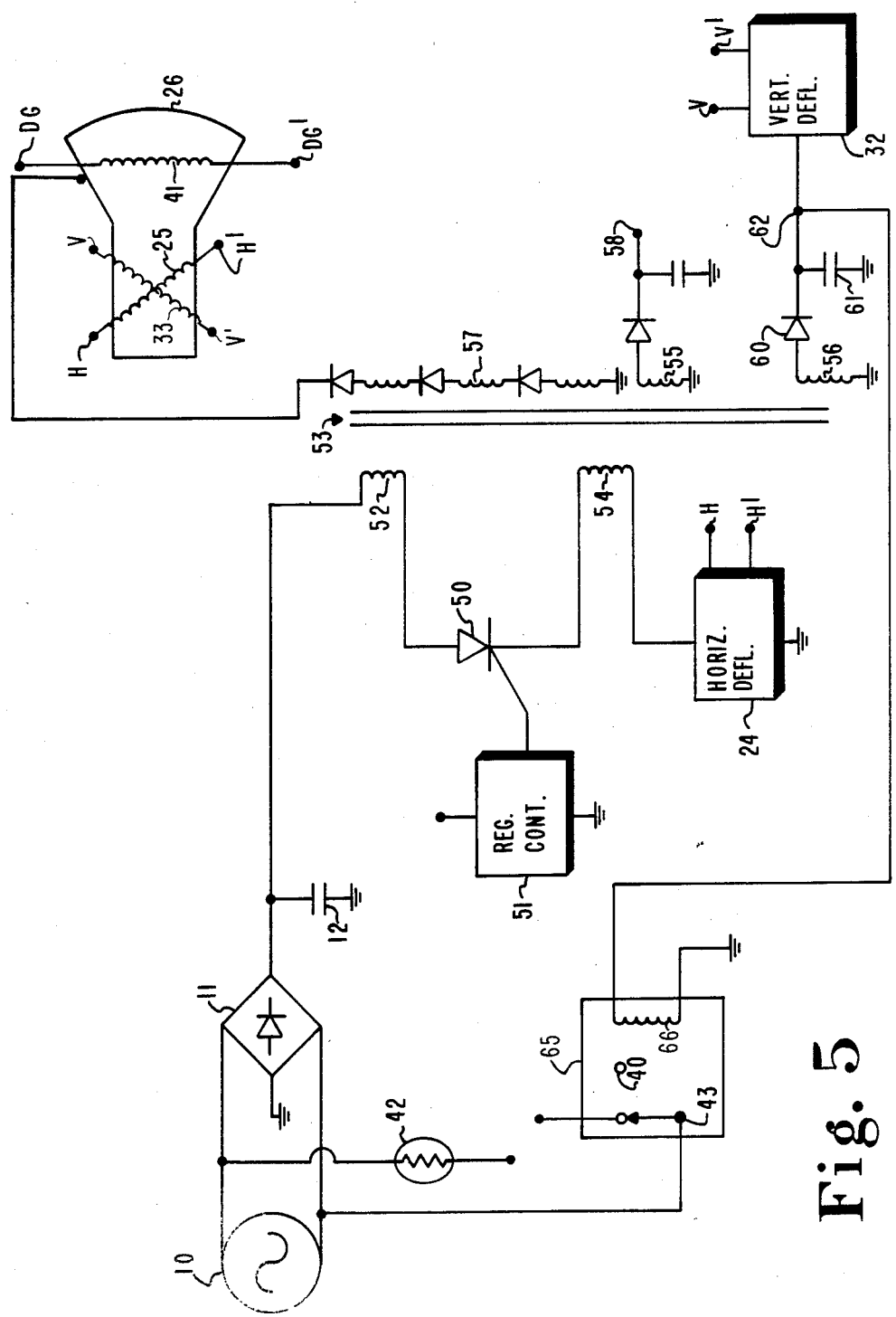
FIG. 5 is a schematic and block diagram of a video display apparatus incorporating another aspect of the present invention.

FIG. 5 illustrates an embodiment of a video display apparatus similar to that shown in FIG. 3 incorporating a degaussing circuit in which the degaussing relay 65 is connected so as to disconnect the degaussing coil 41 from the source of AC voltage when the relay become energized. Therefore no degaussing current will flow while the video display apparatus is energized or turned on. Upon deenergization or turn-off of the video display apparatus, the voltage across transformer secondary winding 56 decreases so that current flow through relay coil 66 decreases and relay 65 no longer will remain energized. The degaussing coil 41 becomes connected to the AC voltage source 10 and degaussing of the cathode ray tube 26 occurs. Degaussing will therefor occur each time the video display apparatus is turned off. In this embodiment, residual degaussing current will continue to flow while the video display apparatus is deenergized.

What is claimed is:

1. A degaussing circuit for a cathode ray tube of a video display apparatus comprising:
   means for providing an alternating current when said video display apparatus is energized;

a degaussing coil disposed adjacent to said cathode ray tube;

a switch responsive to the presence of said alternating current for causing said alternating current to flow in said degaussing coil;

means coupled to said degaussing coil and to said switch and responsive to the flow of said alternating current for decreasing said current flow through said degaussing coil after a first predetermined internal to effect degaussing of said cathode ray tube;

a capacitor coupled to said switch, said capacitor becoming charged for causing said switch to become nonconductive such that said current flow is terminated in said degaussing coil after a second predetermined interval greater than said first predetermined interval; and means for discharging said capacitor when said video display apparatus is deenergized.

2. The arrangement defined in claim 1, wherein said switch comprises a degaussing relay.

3. The arrangement defined in claim 1, wherein said means for decreasing said current flow comprises a temperature dependent resistor.

4. A degaussing circuit for a cathode ray tube of a video display apparatus comprising:

means for providing an alternating current when said video display apparatus is energized;

a degaussing coil disposed adjacent to said cathode ray tube;

a switch responsive to the presence of said alternating current for causing said alternating current to flow in said degaussing coil;

means coupled to said degaussing coil and to said switch and responsive to the flow of said alternating current for decreasing said current flow through said degaussing coil after a first predetermined interval to effect degaussing of said cathode ray tube;

a capacitor coupled to said switch, said capacitor becoming charged for causing said switch to become nonconductive such that said current flow is terminated in said degaussing coil after a second predetermined interval greater than said first predetermined interval; and a resistor coupled in parallel with said capacitor for extending the duration that said alternating current flows in said degaussing coil and for discharging said capacitor when said video display apparatus is deenergized.

* * * * *

UNITED STATES PATENT AND TRADEMARK OFFICE
CERTIFICATE OF CORRECTION

PATENT NO. : 4,742,270

DATED : May 3, 1988

INVENTOR(S) : Ronald E. Fernsler, et al.

It is certified that error appears in the above-identified patent and that said Letters Patent is hereby corrected as shown below:

On the title sheet, the following inventor should be added:
-- Jeffery B. Lendaro , Indianapolis, Ind. --.

Signed and Sealed this

Twenty-seventh Day of September, 1988

Attest:

DONALD J. QUIGG

*Attesting Officer*  *Commissioner of Patents and Trademarks*